(12) United States Patent
Watanabe et al.

(10) Patent No.: US 7,211,013 B2
(45) Date of Patent: May 1, 2007

(54) HYDRAULIC CONTROL APPARATUS FOR V-BELT TYPE CONTINUOUSLY VARIABLE TRANSMISSION

(75) Inventors: Shinichiro Watanabe, Fuji (JP); Naoya Inoue, Fuji (JP); Makoto Sawada, Fuji (JP)

(73) Assignee: JATCO Ltd (JP)

( * ) Notice: Subject to any disclaimer, the term of this patent is extended or adjusted under 35 U.S.C. 154(b) by 523 days.

(21) Appl. No.: 10/661,825

(22) Filed: Sep. 12, 2003

(65) Prior Publication Data
US 2004/0116219 A1    Jun. 17, 2004

(30) Foreign Application Priority Data
Sep. 12, 2002   (JP) .............................. 2002-266277

(51) Int. Cl.
F16H 61/00    (2006.01)
F16H 61/06    (2006.01)
(52) U.S. Cl. ............................ 474/18; 474/28; 477/45
(58) Field of Classification Search .................. 474/18, 474/28; 477/45–50, 37, 43, 125, 39
See application file for complete search history.

(56) References Cited

U.S. PATENT DOCUMENTS

| | | | | |
|---|---|---|---|---|
| 4,890,516 A | * | 1/1990 | Suzuki ........................ | 477/46 |
| 4,923,433 A | * | 5/1990 | Tanaka et al. ................ | 474/28 |
| 5,067,603 A | * | 11/1991 | Kato et al. .................... | 477/39 |
| 5,569,114 A | | 10/1996 | Matsuda et al. | |
| 5,762,576 A | * | 6/1998 | Aoki et al. ................... | 474/28 |
| 6,547,694 B2 | * | 4/2003 | Miyagawa et al. ........... | 477/45 |
| 6,597,979 B2 | * | 7/2003 | Hagiwara et al. ............. | 701/67 |
| 6,666,793 B2 | * | 12/2003 | Narita et al. .................. | 477/40 |

(Continued)

FOREIGN PATENT DOCUMENTS

EP    0 440 422 A2    8/1991

(Continued)

OTHER PUBLICATIONS

Relevant portion of European Search Report of corresponding European Application EP 03 25 5490.

*Primary Examiner*—Marcus Charles
(74) *Attorney, Agent, or Firm*—Rossi, Kimms & McDowell LLP

(57) ABSTRACT

There is provided a hydraulic control apparatus for a belt CVT, which is comprised of a pulley pressure control section that controls the line pressure in accordance with the oil amount balance of an oil pump based on the engine speed and the oil temperature during a select-judgment period from the detection of a change from a driving range to a non-driving range or a change from the non-driving range to the driving range to the lapse of a predetermined period of time, or when the non-driving range is detected. This eliminates the possibility that the oil pump cannot generate a specified oil pressure due to a decrease in the engine speed. Further, the secondary pressure is multiplied by the ratio of the line pressure in accordance with the oil amount balance of the oil pump to the line pressure which has been intended to be specified, and the secondary pressure is controlled according to the calculation result. This makes it possible to maintain the pulley ratio without causing a down-shift of the belt CVT.

4 Claims, 4 Drawing Sheets

U.S. PATENT DOCUMENTS

| | | | |
|---|---|---|---|
| 6,733,417 B2 * | 5/2004 | Ajimoto | 477/45 |
| 6,800,044 B2 * | 10/2004 | Inamura | 474/18 |
| 2001/0049319 A1 | 12/2001 | Yamamoto et al. | |
| 2002/0022547 A1 * | 2/2002 | Hino | 477/45 |

FOREIGN PATENT DOCUMENTS

| | | |
|---|---|---|
| EP | 0 727 598 A2 | 8/1996 |
| EP | 0 781 940 A1 | 7/1997 |
| JP | (01-153851 A * | 6/1989 ... 474/69 |
| JP | (2001-330134 A * | 11/2001 |

* cited by examiner

US 7,211,013 B2

HYDRAULIC CONTROL APPARATUS FOR V-BELT TYPE CONTINUOUSLY VARIABLE TRANSMISSION

BACKGROUND OF THE INVENTION

1. Field of the Invention

The present invention relates to a hydraulic control apparatus for a V-belt type continuously variable transmission, which is capable of controlling a line pressure and a secondary pressure in accordance with the oil amount balance of an oil pump.

2. Description of the Prior Art

Conventionally, a V-belt type continuously variable transmission (hereinafter referred to as "belt CVT") using a V belt has been known as a continuously variable transmission which can be suitably applied to a vehicle. The belt CVT is constructed by winding the V-belt around a primary pulley and a secondary pulley, and groove widths of the primary pulley and the secondary pulley are variably controlled by oil pressure.

An oil pump is connected to an input shaft of the belt CVT, and a pressure regulating valve regulates an oil pressure generated by the oil pump to generate a line pressure. A first cylinder chamber and a second cylinder chamber are provided to the primary pulley and the secondary pulley, respectively. The line pressure is supplied to the first cylinder chamber via a shift control valve as a primary pressure, and a secondary pressure obtained by regulating the line pressure is supplied to the second cylinder chamber. The groove widths of the primary pulley and the secondary pulley are changed according to the oil pressures supplied to the respective cylinder chambers, and the gear ratio continuously varies according to the radius of contact between the V belt and each of the pulleys.

Further, the primary pressure receiving area of the first cylinder chamber and the secondary pressure receiving area of the second cylinder chamber are set to be equal (see for example, Japanese Laid-Open Patent Publication No. 2001-165293).

The conventional belt CVT as described above, however, has the problem that in the case when the shift range is switched from a D range to an N range and then switched to the D range while an accelerator pedal is kept OFF in a high vehicle speed range, the oil pump which generates basic pressure for the line pressure cannot generate a specified oil pressure due to a decrease in the engine speed in the N range. Therefore, the actual line pressure, primary pressure, and secondary pressure are equal to each other, and hence a high vehicle speed gear ratio cannot be maintained and a downshift occurs.

SUMMARY OF THE INVENTION

It is therefore an object of the present invention for a V-belt type continuously variable transmission, which is capable of preventing a specified line pressure from becoming higher than an oil pressure generated by an oil pump.

To attain the above object, there is provided a hydraulic control apparatus for a V-belt type continuously variable transmission in which a primary pressure is applied on the primary pulley connected to an engine side and a secondary pressure is applied on the secondary pulley connected to an output shaft, comprising: an oil pump connected to the engine, for generating a basic pressure for a line pressure which is a basic pressure for the primary pressure and the secondary pressure; a hydraulic control section that controls the line pressure and the secondary pressure; range detecting means for detecting a range selected by an operator; and engine speed detecting means for detecting a revolution speed of the engine; and wherein the hydraulic control section is operable during a predetermined period of time after the range detecting means detects a change from a driving range to a non-driving range or a change from the non-driving range to the driving range, or when the non-driving range is detected, for calculating a value of the line pressure according to oil amount balance of the oil pump relative to the engine speed and controlling the line pressure according to the calculated value of the line pressure.

With the above arrangement, when a predetermined period of time has elapsed after the detection of a change from the driving range to the non-driving range or a change from the non-driving range to the driving range, or when the non-driving range is detected, the hydraulic control section controls the line pressure according to the oil amount balance of the oil pump relative to the engine speed. Therefore, it is possible to prevent a specified line pressure from becoming higher than the oil pressure generated by the oil pump even in the case where the oil pressure generated by the oil pump is reduced due to a decrease in the engine speed.

The above and other objects, features, and advantages of the invention will become more apparent from the following detailed description taken in conjunction with the accompanying drawings.

DETAILED DESCRIPTION OF THE PREFERRED EMBODIMENT

The present invention will now be described in detail with reference to the drawings showing a preferred embodiment thereof.

Figure 1:
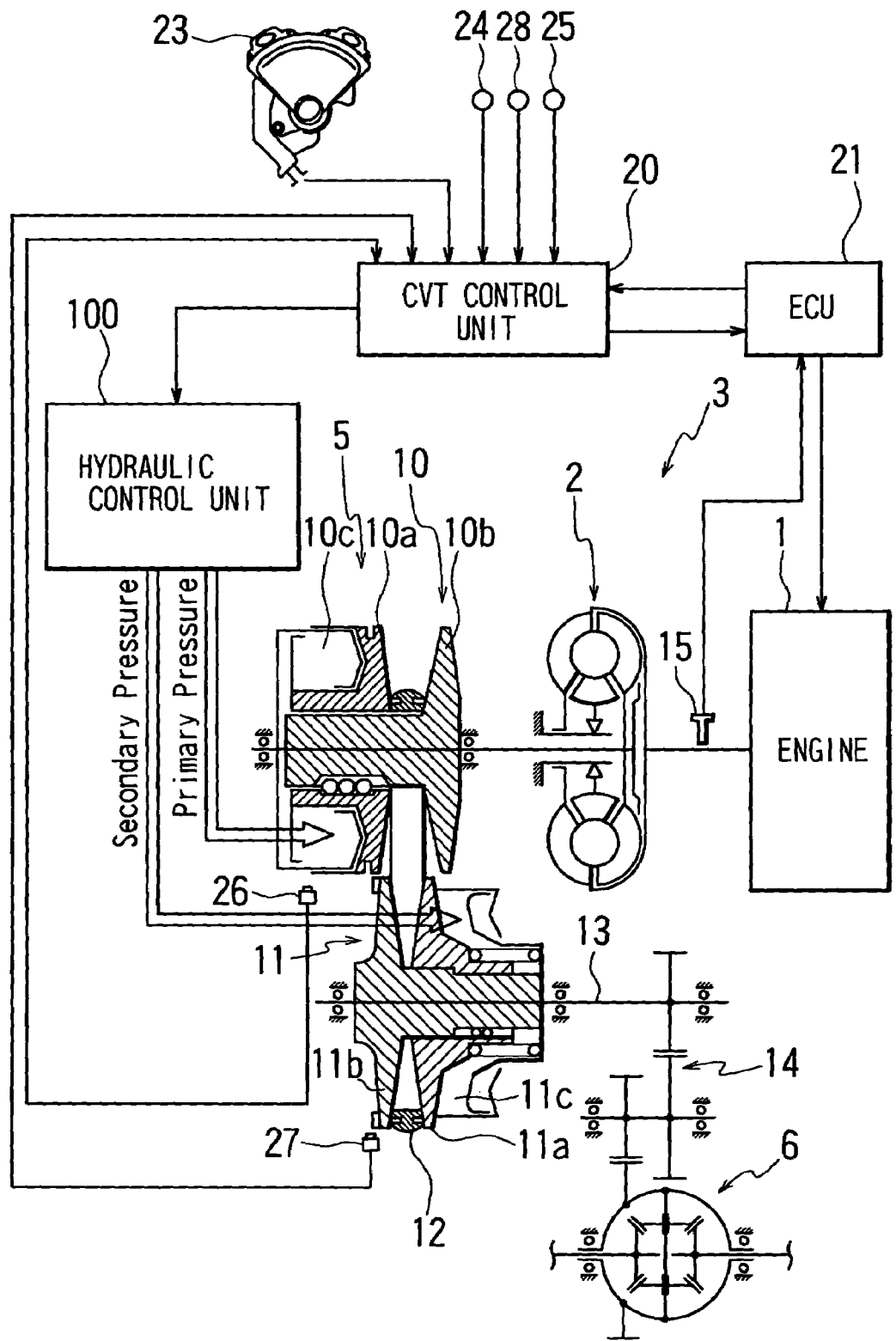
FIG. 1 is a diagram showing the construction of a hydraulic control apparatus for a V-belt type continuously variable transmission according to an embodiment of the present invention.
Figure 2:
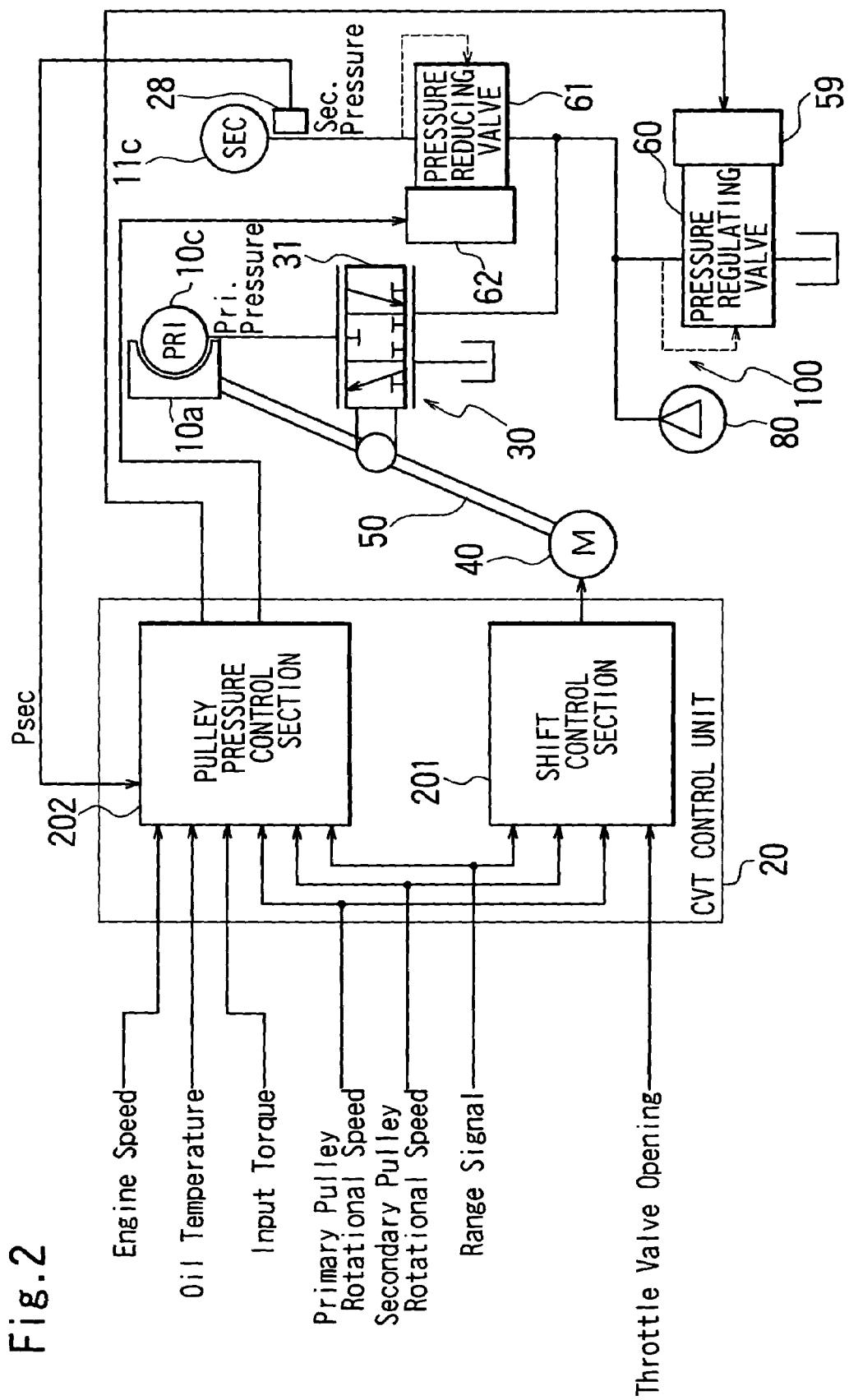
FIG. 2 is a diagram schematically showing the constructions of a hydraulic control unit and a CVT control unit.

FIG. 1 is a diagram schematically showing a belt CVT according to an embodiment of the present invention, and FIG. 2 is a diagram schematically showing the constructions of a hydraulic control unit and a CVT control unit.

In FIG. 1, a belt CVT 3 comprised of a transmission mechanism 5 including a forward-backward driving switching mechanism, not shown, and a torque converter 2 including a lock-up clutch is connected to an engine 1. The transmission mechanism 5 is comprised of a pair of variable pulleys consisting of a primary pulley 10 connected to an input shaft side and a secondary pulley 13 connected to an output shaft 13, and the pair of variable pulleys 10 and 11 are connected to each other via a V belt 12. It should be noted that the output shaft 13 is connected to a differential gear 6 via an idler gear 14.

The gear ratio of the transmission 5 and the contact frictional force of the V belt 12 are controlled by a hydraulic control unit 100 that is operable in response to commands given from a CVT control unit 20. The CVT control unit 20 is connected to an engine control unit (hereinafter referred to as "ECU") 21 that controls the engine 1 so that the CVT control unit 20 and the ECU 21 can exchange information with each other. The CVT control unit 20 determines the gear ratio and the contact frictional force according to input torque information obtained from the ECU 21, the throttle valve opening (TVO) obtained from a throttle opening sensor 24, and so forth. Further, an engine speed sensor 15 that detects the revolution speed of the engine 1 is connected to the ECU 21.

The primary pulley 10 of the transmission mechanism 5 is comprised of a fixed conical plate 10b that rotates integrally with an input shaft, and a movable conical plate 10a that is opposed to the fixed conical plate 10b to form a V-shaped pulley groove and is capable of being displaced in the axial direction according to oil pressure (hereinafter referred to as "primary pressure") applied to a primary pulley cylinder chamber 10c.

The secondary pulley 11 is comprised of a fixed conical plate 11b that rotates integrally with the output shaft 13, and a movable conical plate 11a that is opposed to the fixed conical plate 11b to form a V-shaped pulley groove and is capable of being displaced in the axial direction according to oil pressure (hereinafter referred to as "secondary pressure") applied to a secondary pulley cylinder chamber 11c.

The pressure-receiving area of the primary pulley cylinder chamber 10c is set to be equal to that of the secondary pulley cylinder chamber 11c.

The torque inputted from the engine 1 is inputted to the transmission mechanism 5 via the torque converter 2, and is transmitted from the primary pulley 10 to the secondary pulley 11 via the V belt 12. The movable conical plate 10a of the primary pulley 10 and the movable conical plate 11a of the secondary pulley 11 are displaced in the axial direction to change the radius of contact between the V belt 12 and each of the pulleys 10 and. 11, so that the gear ratio between the primary pulley 10 and the secondary pulley 11 can be changed continuously.

As shown in FIG. 2, the hydraulic control unit 100 is comprised mainly of a pressure regulating valve 60 that controls the line pressure, a shift control valve 30 that controls the primary (Pri) pressure which is applied to the primary pulley cylinder chamber 10c, and a pressure reducing valve 61 that controls the secondary (Sec) pressure which is applied to the secondary pulley cylinder chamber 11c.

The shift control valve 30 is connected to a servo link 50 constituting a mechanical feedback mechanism, so that the shift control valve 30 is driven by a step motor 40 connected to one end of the servo link 50 and receives feedback of the groove width, i.e. the actual gear ratio from the movable conical plate 10a of the primary pulley 10 connected to the other end of the servo link 50.

A line pressure control system is comprised of the pressure regulating valve 60 including a solenoid 59 that regulates pressure oil supplied from an oil pump 80, so that the pressure oil is controlled to a predetermined line pressure according to the driving condition in accordance with a command (e.g. a duty signal) given from the CVT control unit 20. The line pressure is supplied to the shift control vale 30 that controls the primary pressure, and the pressure reducing valve 61 provided with a solenoid 62 that controls the secondary pressure. The oil pump 80 is connected to the input shaft of the belt CVT 3 and is driven by engine revolution to generate oil pressure.

The gear ratio of the primary pulley 10 to the secondary pulley 11 is controlled by the step motor 40 that is driven in response to a shift command signal given from the CVT control unit 20, and a spool 31 of the shift control valve 30 is driven according to the displacement of the servo link 50 moving in response to the movement of the step motor 40 to supply the primary pulley 10 with the primary pressure obtained by regulating the line pressure supplied to the shift control valve 30, so that the groove width is variably controlled to set a predetermined gear ratio.

It should be noted that the shift control valve 30 supplies and releases oil pressure to and from the primary pulley cylinder chamber 10c according to the displacement of the spool 31, and controls the primary pressure so that the target gear ratio can be achieved at a position where the step motor 40 is driven. When gear shift has been actually finished, the shift control valve 30 closes the spool 31 in response to the displacement of the servo link 50.

It should be noted that the CVT control unit 20 variably controls the gear ratio and the contact frictional force of the V belt 12 by reading signals from a primary pulley speed sensor 26 that detects the rotational speed of the primary pulley 10 of the transmission 5, a secondary pulley speed sensor 27 that detects the rotational speed of the secondary pulley 11 (or the vehicle speed), and a secondary pressure sensor 28 that detects the secondary pressure applied to the secondary pulley cylinder chamber 11c, all of which are appearing in FIG. 1, and a range signal outputted from an inhibitor switch 23 appearing in FIG. 1, as well as a throttle valve opening (TVO) from the throttle opening sensor 24 that detects the opening degree of the throttle valve which is opened and closed according to the operation of an accelerator pedal by the driver, and the oil temperature of the transmission 5 detected by a temperature sensor 25 appearing in FIG. 1.

The CVT control unit 20 is comprised of a shift control section 201 that determines the target gear ratio according to the vehicle speed and the throttle valve opening and drives the step motor 40 to control the actual gear ratio to the target gear ratio, and a pulley pressure control section 202 that calculates the thrust (contact frictional force) of the primary pulley 10 and the secondary pulley 11 according to the input torque, gear ratio, oil temperature, and so forth and converts the calculated thrust to an oil pressure.

The pulley pressure control section 202 determines the target value of the line pressure according to the input torque information and the gear ratio based on the rotational speed of the primary pulley 10 and the rotational speed of the secondary pulley 11, and the oil temperature, and drives the solenoid 59 of the pressure regulating valve 60 to control the line pressure. The pulley pressure control section 202 also determines the target value of the secondary pressure and drives the solenoid 62 of the pressure reducing valve 61 according to the secondary pressure detected by the secondary pressure sensor 28 and the target value of the secondary pressure, thus controlling the secondary pressure by feedback control (closed-loop control).

A description will now be given of how the line pressure and the secondary pressure are controlled during a select-judgment period or during a non-driving range judgment period.

Figure 3:
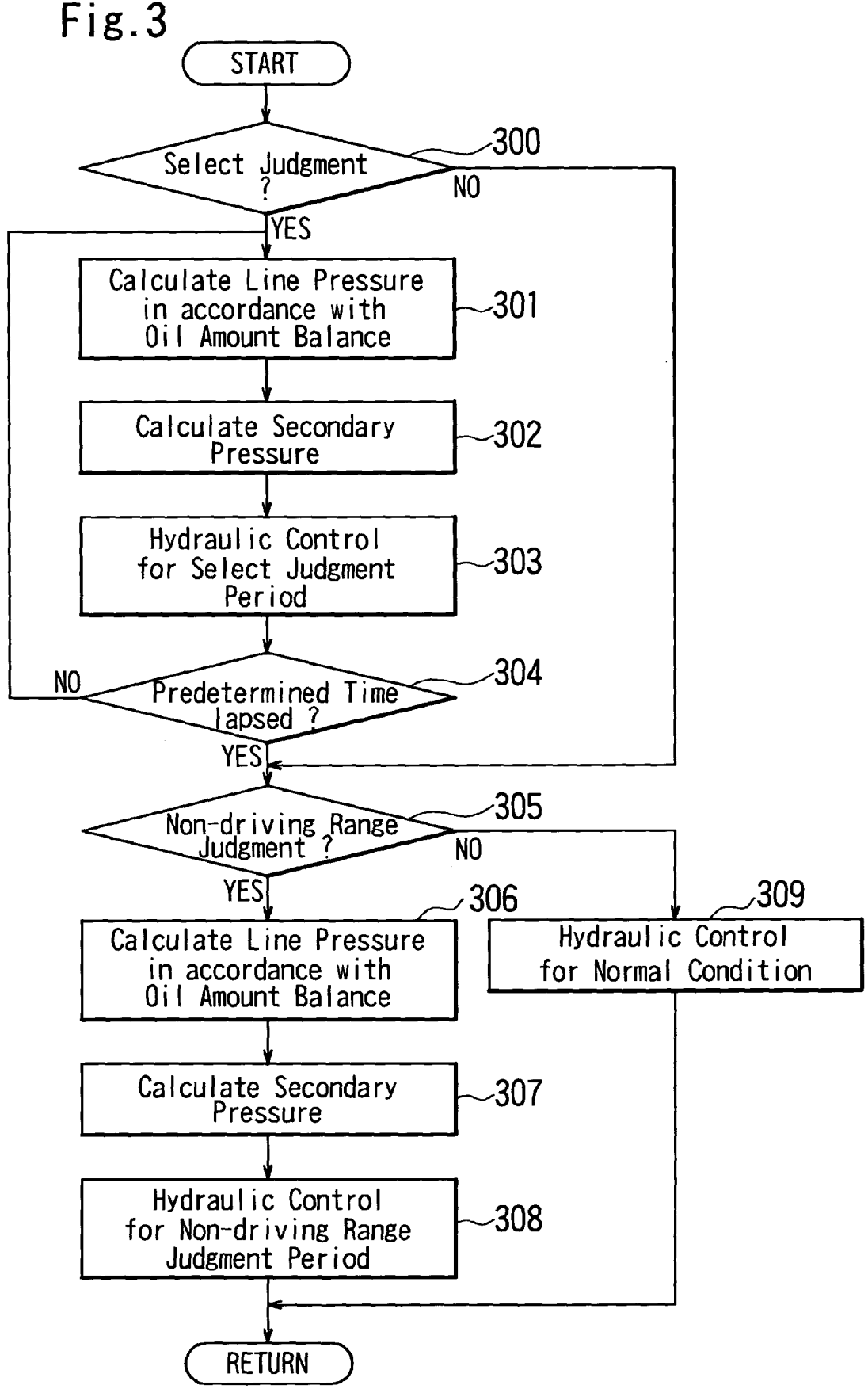
FIG. 3 is a flow chart showing the procedure for calculating the line pressure and the secondary pressure.
Figure 4:
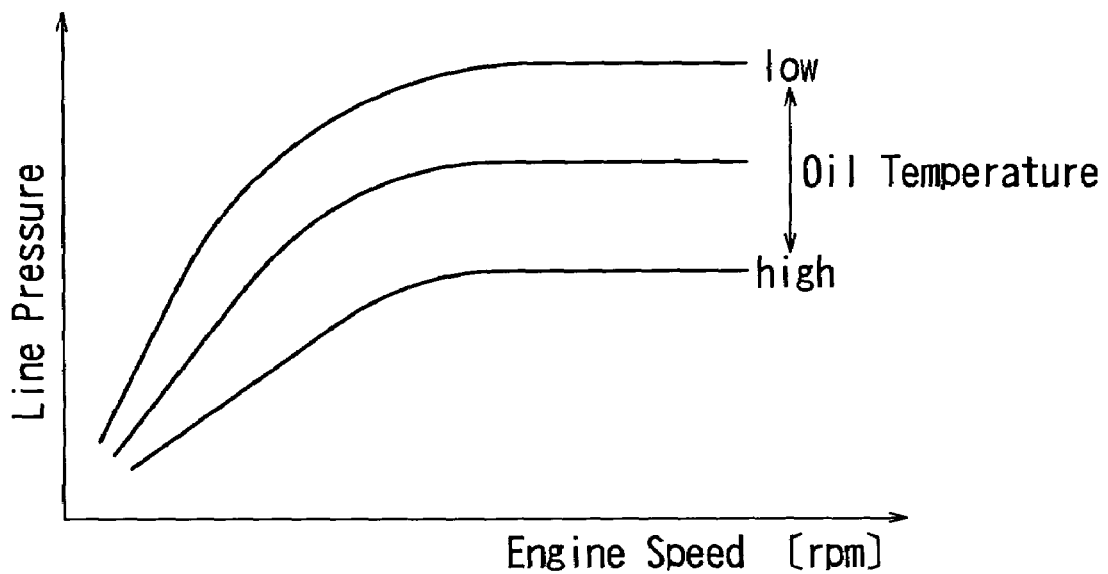
FIG. 4 is a graph showing the relationship between the engine speed and the line pressure corresponding to the oil temperature.

FIG. 3 is a flow chart showing the procedure for controlling the line pressure and the secondary pressure by the pulley pressure control section 202, and FIG. 4 is a graph showing the relationship between the engine speed and the specified line pressure in accordance with the oil amount balance of the oil pump 80.

Here, a select-judgment means such a judgment that the range signal inputted from the inhibitor switch 23 to the pulley pressure control section 202 is indicative of a change from a driving range (such as a D range or an R range) to a non-driving range (such as an N range or a P range) or a change from the non-driving range to the driving range, and the select-judgment period means a period from the select-judgment to the lapse of a predetermined period of time (for example, 1.5 to 2 seconds). Further, the non-driving range judgment period means a period in which the range signal indicative of the non-driving range is inputted from the inhibitor switch 23 to the pulley pressure control section 202.

The pulley pressure control section 202 determines in a step 300 whether the select-judgment has been made due to the detection of a change in the range signal inputted from the inhibitor switch 23. If it is determined that the select-judgment has not been made, the process proceeds to a step 305. On the other hand, if it is determined that the select-judgment has been made, the process proceeds to a step 301 wherein a line pressure which is set to be lower than normal is calculated in accordance with the oil amount balance of the oil pump 80.

The calculation of the line pressure in accordance with the oil amount balance of the oil pump is performed based on the engine speed (rpm) obtained from the engine speed sensor 15 and the oil temperature obtained from the oil temperature sensor 25. As shown in FIG. 4, the line pressure is determined such that the line pressure becomes higher as the engine speed (rpm) increases, and that the line pressure becomes lower as the oil temperature increases.

In a step 302, the secondary pressure is calculated based on the line pressure calculated in the step 301. To maintain the pulley ratio of the belt CVT 3, the calculation of the secondary pressure is performed by multiplying the secondary pressure which has been intended to be specified by the ratio of the line pressure calculated in the step 301 to the line pressure which has been intended to be specified in the case where the select-judgment has not been made. The secondary pressure thus calculated is lower than normal. In a step 303, hydraulic control for the select-judgment period is carried out using the line pressure and the secondary pressure calculated in the steps 301 and 302, respectively.

In a step 304, it is determined whether the select-judgment period from the select-judgment to the lapse of a predetermined period of time has elapsed or not. This determination is made by determining whether a predetermined period of time (for example, 1.5 to 2 seconds) has elapsed or not after the select-judgment. If it is determined in the step 304 that the predetermined period of time has not elapsed, the process returns to the step 301 wherein hydraulic control is continuously carried out in accordance with the oil amount balance of the oil pump 80.

On the other hand, if it is determined in the step 304 that the predetermined period of time has elapsed, the process proceeds to the step 305 wherein it is determined whether or not the range signal inputted from the inhibitor switch 23 is indicative of the N range or the P range. If it is determined that the range signal is indicative of the non-driving range, the process proceeds to a step 306. In the step 306, the line pressure set to be lower than normal is calculated in accordance with the oil amount balance of the oil pomp 80 as in the above described step 301.

In a step 307, to maintain the pulley ratio of the belt CVT 3, as in the above described step 302, the secondary pressure is calculated based on the line pressure calculated in the step 306. The secondary pressure thus calculated is lower than normal. In a step 308, hydraulic control for the non-driving range judgment period is carried out using the line pressure and the secondary pressure calculated in the steps 306 and 307, respectively.

On the other hand, if it is determined in the step 305 that the range signal inputted from the inhibitor switch 23 is not indicative of the non-driving range, the process proceeds to a step 309 wherein the line pressure and the secondary are controlled in a manner suitable for a normal condition. Upon completion of all the processing, the process returns to the step 300 to repeat the above described processing.

For example, if the range signal inputted from the inhibitor switch 23 has changed from the range signal indicative of the D range to the range signal indicative of the N range, the pulley pressure control section 202 makes the select-judgment due to the change from the D range to the N range, and hydraulic control is carried out in accordance with the oil amount balance of the oil pump 80 until the predetermined period of time has elapsed after the select-judgment. When the predetermined period of time has elapsed after the select-judgment, it is determined that the range signal is indicative of the non-driving range, and hydraulic control is carried out in accordance with the oil amount balance of the oil pump 80.

As described above, when the range signal inputted from the inhibitor switch 23 is indicative of the non-driving range, or during the select-judgment period, the pulley pressure control section 202 calculates the line pressure in accordance with the oil amount balance of the oil pump 80 based on the engine speed and the oil temperature. The line pressure thus calculated is lower than normal. Further, the secondary pressure is calculated based on the line pressure so as to maintain the pulley ratio, and hydraulic control is carried out using the calculated line pressure and secondary pressure.

In the present embodiment, the engine speed sensor 15 corresponds to the engine speed detecting means of the present invention, and the steps 300 and 305 correspond to the range detecting means of the present invention. Further, the pulley pressure control section 202 corresponds to the hydraulic control section of the present invention.

According to the present embodiment described above, during the select-judgment period from the detection of a change from the driving range to the non-driving range or a change from the non-driving range to the driving range to the lapse of a predetermined period of time, or when the non-driving range is detected, the line pressure according to the oil amount balance of the oil pump relative to the engine speed is specified. Therefore, it is possible to prevent the specified line pressure from becoming higher than the oil pressure generated by the oil pump due to a decrease in the engine speed, and to maintain the proper relationship between the line pressure and the oil pressure generated by the oil pump.

Further, during the select-judgment period, or when the non-driving range is detected, the secondary pressure is controlled by multiplying it by the ratio of the calculated line pressure to the line pressure which has been intended to be specified, so that the pulley ratio of the belt CVT can be maintained even when the line pressure is controlled according to the oil amount balance of the oil pump.

Further, during the select-judgment period, or when the non-driving range is detected, the line pressure is calculated in accordance with the oil amount balance of the oil pump based on the oil temperature and the engine speed, so that the line pressure can be calculated reliably in accordance with the oil amount balance of the oil pump.

Although in the above described embodiment, the engine speed is detected using the engine speed sensor 15, the present invention is not limited to this, but the engine speed may be calculated in the ECU 21 that controls the engine.

What is claimed is:

1. A hydraulic control apparatus for a V-belt type continuously variable transmission in which a primary pressure is applied on the primary pulley connected to an engine side and a secondary pressure is applied on the secondary pulley connected to an output shaft, comprising:
   an oil pump connected to the engine, for generating a basic pressure for a line pressure as a basic pressure for the primary pressure and the secondary pressure;
   a hydraulic control section that controls the line pressure and the secondary pressure;
   range detecting means for detecting a range selected by an operator; and
   engine speed detecting means for detecting a revolution speed of the engine; and
   wherein said hydraulic control section is operable during a predetermined period of time after said range detecting means detects a change from a driving range to a non-driving range or a change from the non-driving range to the driving range, or when the non-driving range is detected, for calculating a value of the line pressure according to oil amount balance of said oil pump relative to the engine speed and controlling the line pressure according to the calculated value of the line pressure.

2. A hydraulic control apparatus for a V-belt type continuously variable transmission according to claim 1, comprising:
   an oil temperature sensor that detects a temperature of oil in the V-belt type continuously variable transmission; and
   wherein said hydraulic control section is operable when calculating the value of the line pressure according to the oil amount balance of said oil pump, for calculating the value of the line pressure according to the temperature detected by said oil temperature sensor.

3. A hydraulic control apparatus for a V-belt type continuously variable transmission in which a primary pressure is applied on the primary pulley connected to an engine side and a secondary pressure is applied on the secondary pulley connected to an output shaft, comprising:
   an oil pump connected to the engine, for generating a basic pressure for a line pressure as a basic pressure for the primary pressure and the secondary pressure;
   a hydraulic control section that controls the line pressure and the secondary pressure;
   range detecting means for detecting a range selected by an operator; and
   engine speed detecting means for detecting a revolution speed of the engine; and
   wherein said hydraulic control section is operable during a predetermined period of time after said range detecting means detects a change from a driving range to a non-driving range or a change from the non-driving range to the driving range, or when the non-driving range is detected, for calculating a value of the line pressure according to oil amount balance of said oil pump relative to the engine speed and controlling the line pressure according to the calculated value of the line pressure,
   wherein said hydraulic control section is operable when controlling the line pressure according to the oil amount balance of said oil pump, for further multiplying a value of the secondary pressure to be specified in a case where said range detecting means has not detected a change from the driving range to the non-driving range or a change from the non-driving range to the driving range, or in a case said range detecting means has not detected the non-driving range, by a ratio of the line pressure according to the oil amount balance of said oil pump to a line pressure specified in the case where said range detecting means has not detected the change from the driving range to the non-driving range or the change from the non-driving range to the driving range, or in the case said range detecting means has not detected the non-driving range, and controlling the secondary pressure according to the calculated value of the secondary pressure.

4. A hydraulic control apparatus for a V-belt type continuously variable transmission in which a primary pressure is applied on the primary pulley connected to an engine side and a secondary pressure is applied on the secondary pulley connected to an output shaft, comprising:
   an oil pump connected to the engine, for generating a basic pressure for a line pressure as a basic pressure for the primary pressure and the secondary pressure;
   a hydraulic control section that controls the line pressure and the secondary pressure;
   range detecting means for detecting a range selected by an operator; and
   engine speed detecting means for detecting a revolution speed of the engine; and
wherein said hydraulic control section is operable during a predetermined period of time after said range detecting means detects a change from a driving range to a non-driving range or a change from the non-driving range to the driving range, or when the non-driving range is detected, for calculating a value of the line pressure according to oil amount balance of said oil pump relative to the engine speed and controlling the line pressure according to the calculated value of the line pressure, further comprising
   an oil temperature sensor that detects a temperature of oil in the V-belt type continuously variable transmission; and
   wherein said hydraulic control section is operable when calculating the value of the line pressure according to the oil amount balance of said oil pump, for calculating the value of the line pressure according to the temperature detected by said oil temperature sensor,
   wherein said hydraulic control section is operable when controlling the line pressure according to the oil amount balance of said oil pump, for further multiplying a value of the secondary pressure to be specified in a case where said range detecting means has not detected a change from the driving range to the non-driving range or a change from the non-driving range to the driving range, or in a case said range detecting means has not detected the non-driving range, by a ratio of the line pressure according to the oil amount balance of said oil pump to a line pressure intended to be specified in the case where said range detecting means has not detected the change from the driving range to the non-driving range or the change from the non-driving range to the driving range, or in the case said range detecting means has not detected the non-driving range, and controlling the secondary pressure according to the calculated value of the secondary pressure.

* * * * *